(12) United States Patent
Mathiske

(10) Patent No.: US 6,772,296 B1
(45) Date of Patent: Aug. 3, 2004

(54) METHOD AND APPARATUS FACILITATING AUTOMATIC PERSISTENCE IN ASYMMETRIC STORAGE

(75) Inventor: Bernd J. W. Mathiske, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 669 days.

(21) Appl. No.: 09/636,419

(22) Filed: Aug. 10, 2000

(51) Int. Cl.[7] .............................................. G06F 12/12
(52) U.S. Cl. ...................... 711/138; 711/113; 711/134; 711/135; 365/185.9; 365/185.11; 365/185.33
(58) Field of Search ................................. 711/144, 134, 711/135, 138, 113; 707/10; 714/6; 709/101; 365/185.9, 185.1, 185.33

(56) References Cited

U.S. PATENT DOCUMENTS

| | | | | |
|---|---|---|---|---|
| 5,920,863 A | * | 7/1999 | McKeehan et al. | ............ 707/10 |
| 6,061,708 A | * | 5/2000 | McKeehan et al. | ......... 709/101 |
| 6,542,967 B1 | * | 4/2003 | Major | ......................... 711/134 |

OTHER PUBLICATIONS

POS8, Eight International Workshop on Persistent Object Systems: Design, Implementation and Use, Aug. 30th Aug.–1st Sep. 1998 (http://www–ppg.dcs.st–and.ac.uk/Conferences/POS8/Abstracts.html).*
Publication entitled "Perdis: Design, Implementation, and Use of a Persistent Distributed Store", By Paulo Ferreira et al., Institut National De Recherche En Informatique et en Automatique, No. 3525, Oct. 1998, Theme 1B.

* cited by examiner

Primary Examiner—Mano Padmanabhan
Assistant Examiner—Thang Ho
(74) Attorney, Agent, or Firm—Park, Vaughan & Fleming LLP

(57) ABSTRACT

One embodiment of the present invention provides a system that facilitates storage of objects in a persistent memory with asymmetric access characteristics. The system operates by receiving an access to an object. If the access is a read access, the system looks up the object through an indirectory. This indirectory includes an entry that points to a location of the object within the persistent memory if updates to the object have been recorded in the persistent memory. Otherwise, the indirectory entry points to a location of the object within a volatile memory. If the object is located in the volatile memory, the system reads the object from the volatile memory. Otherwise, if the object is located in the persistent memory, the system reads the object from the persistent memory directly without first copying the object into the volatile memory. In one embodiment of the present invention, if the access is a write access, the system looks up the object through the indirectory. If the object is located in the persistent memory, the system allocates a location in the volatile memory for the object, and then copies the object from the persistent memory into the location in the volatile memory. The system then updates the indirectory entry for the object to point to the location in the volatile memory. Next, the system performs the write access to the object in the volatile memory. At a later time, the system commits the object to the persistent memory from the volatile memory.

24 Claims, 5 Drawing Sheets

METHOD AND APPARATUS FACILITATING AUTOMATIC PERSISTENCE IN ASYMMETRIC STORAGE

BACKGROUND

1. Field of the Invention

The present invention relates to storing objects in persistent storage. More specifically, the present invention relates to a method and an apparatus that facilitates storing objects in a persistent storage medium with asymmetric access characteristics, wherein write accesses are much slower than read accesses.

2. Related Art

Millions of people are presently using hand-held computing devices, such as personal digital assistants (PDAs) and personal organizers, to perform simple tasks, such as looking up telephone numbers and scheduling tasks. Developers are continually attempting to migrate progressively larger applications to these hand-held computing devices in order to provide additional functionality. Unfortunately, the limited amount of memory within these hand-held computing devices limits the complexity and size of applications that can be run on them.

Existing virtual memory techniques can be used to increase the effective size of the memory in a hand-held computing device by allowing infrequently used pages within a virtual memory space to be moved to persistent storage. When a page that is located in persistent storage is later needed, it can be moved back into volatile memory.

However, existing techniques to provide virtual memory and to store persistent objects are presently tailored for secondary storage systems with symmetric access characteristics, wherein read and write accesses take roughly the same amount of time, and transfer units for both read and write accesses are the same size.

Designers are beginning to incorporate secondary storage with "asymmetric " access characteristics, such as non-volatile flash memory, into hand-held computing devices in order to provide persistent storage for code and/or data. Read accesses to flash memory are roughly as fast as read accesses to RAM and have a minimum transfer unit of one to eight bytes. In contrast, write accesses to flash memory are much slower, and typically operate on a larger transfer unit of 512 to 512K bytes. Furthermore, flash memory wears out after several million repeated writing and erasure cycles.

Existing mechanisms to facilitate virtual memory and persistent objects presently do not take advantage of the fast read access time to flash memory. They instead require a block containing a data item to be copied from secondary storage to main memory before the data item can be read.

What is needed is a method and an apparatus for facilitating persistent storage in a flash memory that takes advantage of the fast read access times for flash memory and that evenly distributes write operations over the flash memory.

SUMMARY

One embodiment of the present invention provides a system that facilitates storage of objects in a persistent memory with asymmetric access characteristics. The system operates by receiving an access to an object. If the access is a read access, the system looks up the object through an indirectory. This indirectory includes an entry that points to a location of the object within the persistent memory if updates to the object have been recorded in the persistent memory. Otherwise, the indirectory entry points to a location of the object within a volatile memory. If the object is located in the volatile memory, the system reads the object from the volatile memory. Otherwise, if the object is located in the persistent memory, the system reads the object from the persistent memory directly without first copying the object into the volatile memory.

In one embodiment of the present invention, if the access is a write access, the system looks up the object through the indirectory. If the object is located in the persistent memory, the system allocates a location in the volatile memory for the object, and then copies the object from the persistent memory into the location in the volatile memory. The system then updates the indirectory entry for the object to point to the location in the volatile memory. Next, the system performs the write access to the object in the volatile memory. At a later time, the system commits the object to the persistent memory from the volatile memory.

In one embodiment of the present invention, while committing the object to the persistent memory, the system appends the object to a location within a log in the persistent memory, and then updates the indirectory entry for the object to point to the location of the object within the log.

In one embodiment of the present invention, in order to allocate the location in the volatile memory for the object, the system determines if there is space available for the object in the volatile memory. If not, the system creates additional space in the volatile memory by determining if a checkpointing operation is possible. If the checkpointing operation is possible, the system performs the checkpointing operation to commit updated objects from the volatile memory to a log within the persistent memory, thereby freeing up space in the volatile memory. The system also updates corresponding entries for the updated objects in the indirectory to point to the log within the persistent memory.

In a variation on this embodiment, if the checkpointing operation is not possible, the system creates space in the volatile memory by allocating a steal region in the persistent memory. The system then moves updated objects, which are not ready to be committed to the log, into the steal region in the persistent memory. The system also updates corresponding entries for the updated objects in the indirectory to point to the steal region in the persistent memory.

In one embodiment of the present invention, the system periodically checkpoints updated objects from the volatile memory to a log within the persistent memory, and then updates corresponding entries for the updated objects in the indirectory to point to the log in the persistent memory.

In one embodiment of the present invention, the persistent memory includes flash memory, and the volatile memory includes a volatile semi-conductor memory.

In one embodiment of the present invention, the object includes an object defined within an object oriented programming system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
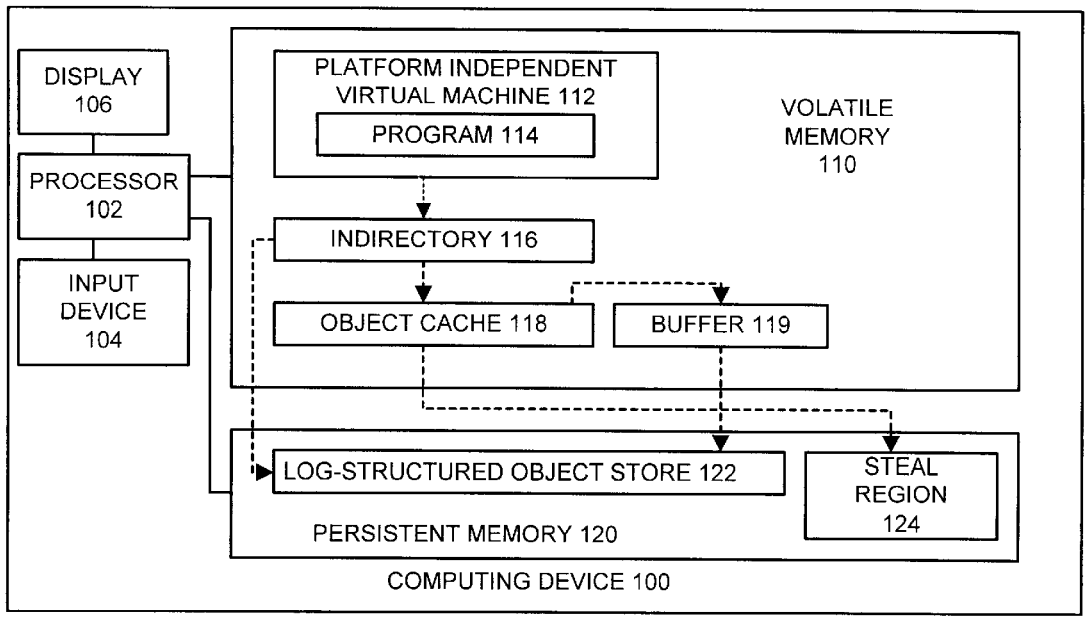
FIG. 1 illustrates a computing device in accordance with an embodiment of the present invention.

FIG. 1 illustrates a computing device 100 in accordance with an embodiment of the present invention. Computing device 100 can generally include any type of computing device, including, but not limited to, a computing device based on a microprocessor, a mainframe computer, a digital signal processor, a portable computing device, a personal organizer, a personal digital assistant, a device controller, or a computational engine within an appliance. Computing device 100 includes display 106 for outputting data to a user, as well as input device 104 for receiving input from the user. Input device 104 can include, but is not limited to, a pen for a touch-sensitive screen on a personal organizer, a pointing device (such as a mouse), and a keyboard.

Display 106 and input device 104 are in communication with processor 102, which performs computational operations for computing device 100 using code and data stored within volatile memory 110 and persistent memory 120.

Volatile memory 110 can include any type of random access memory that requires power in order to continue storing data. This includes, but is not limited to, dynamic random access memory (DRAM) and static random access memory (SRAM).

Persistent memory 120 can include any type of non-volatile memory that can hold data when computing device 100 is powered down. This includes, but is not limited to, flash memory, ROM, EPROM, EEPROM, and battery-backed-up RAM. In a preferred embodiment of the present invention, persistent memory 120 includes flash memory.

Volatile memory 110 contains portions of platform-independent virtual machine 112. Platform-independent virtual machine runs a platform-independent program 114 that can be transferred onto computing device 100 from an external source. Note that program 114 can generally include any type of program that can execute on computing device 100, and is not limited to platform-independent programs.

Program 114 accesses objects through indirectory 116. Indirectory 116 can include any type of mechanism for providing indirection for accesses to objects, such a handle pool or a resident object table. In one embodiment of the present invention, indirectory 116 is organized as an array of pointers that is indexed by a persistent object identifier (PID). Pointers stored within indirectory 116 point to objects within object cache 118, log-structured object store 122 or steal region 124.

In order to conserve volatile memory 110, infrequently used portions of indirectory 116 can be stored within persistent memory 120, and can be pulled into volatile memory 110 when required.

Object cache 118 is a region in volatile memory 110 for storing updated objects from log-structured object store 122 in persistent memory 120.

Log-structured object store 122 contains objects that are accessed by program 114. As objects are updated, they are appended to log-structured object store 122, which grows through persistent memory 120. Updating persistent memory 120 is this way tends to even out the distribution of write operations across persistent memory 120. This helps to extend the life of persistent memory 120.

Steal region 124 is a region within persistent memory 120 that can be used to store updated objects from object cache 118 which are not ready to be committed to object store 122. This allows dirty objects to be moved from object cache 118 in order to make room for other objects without having to commit the objects to object store 122.

Objects to be committed to object store 122 are first assembled into a larger transfer unit within buffer 119 in volatile memory 110. This larger transfer unit is appended to object store 122 in a single write operation.

Indirectory

Figure 2:
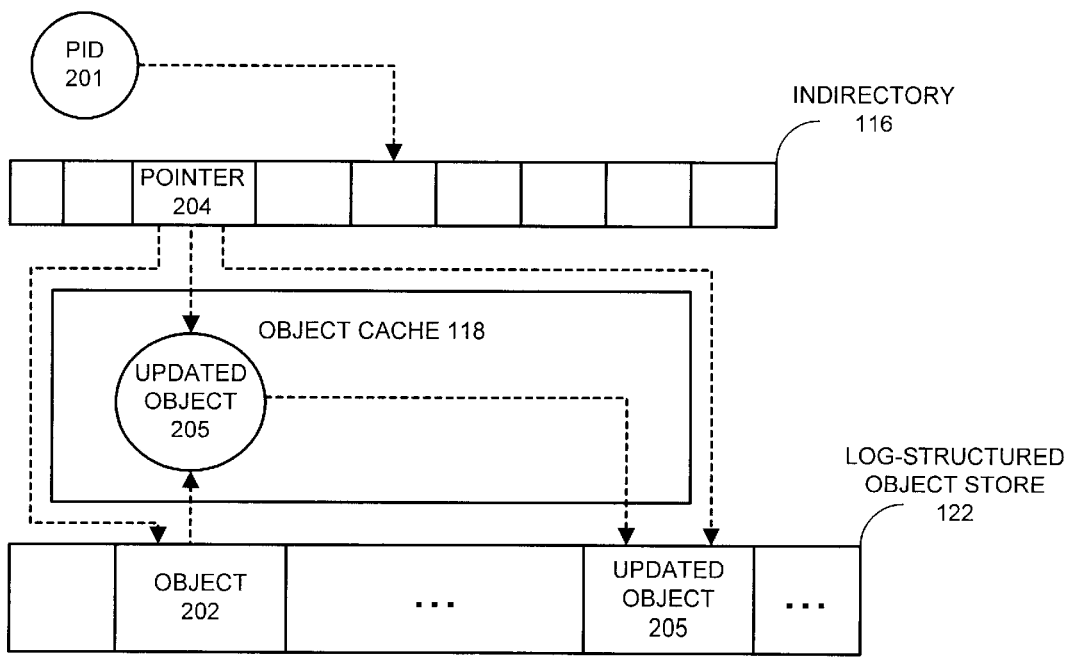
FIG. 2 illustrates the use of an indirectory in accordance with an embodiment of the present invention.

FIG. 2 illustrates the use of indirectory 116 from FIG. 1 in accordance with an embodiment of the present invention. Program 114 accesses an object through persistent object identifier (PID) 201.

PID 201 indexes an entry within indirectory 116, which contains a pointer to either object cache 118 or log-structured object store 122 (and in some cases steal region 124).

Consider the case where an object 202 object is initially located in log-structured object store 122. During a read access, object 202 is read directly from log-structured object store 122. During a write access, object 202 is first moved to object cache 118 where it is updated to form updated object 205. Note that moving object 202 involves updating pointer 204 within indirectory 116 to point to the new location within object cache 118.

At some point in the future, a checkpointing operation commits updated object 205 back into log-structured object store 122. This checkpointing operation involves updating pointer 204 within indirectory 116 to point to the new location in log-structured object store 122.

Servicing an Object Access

Figure 3:
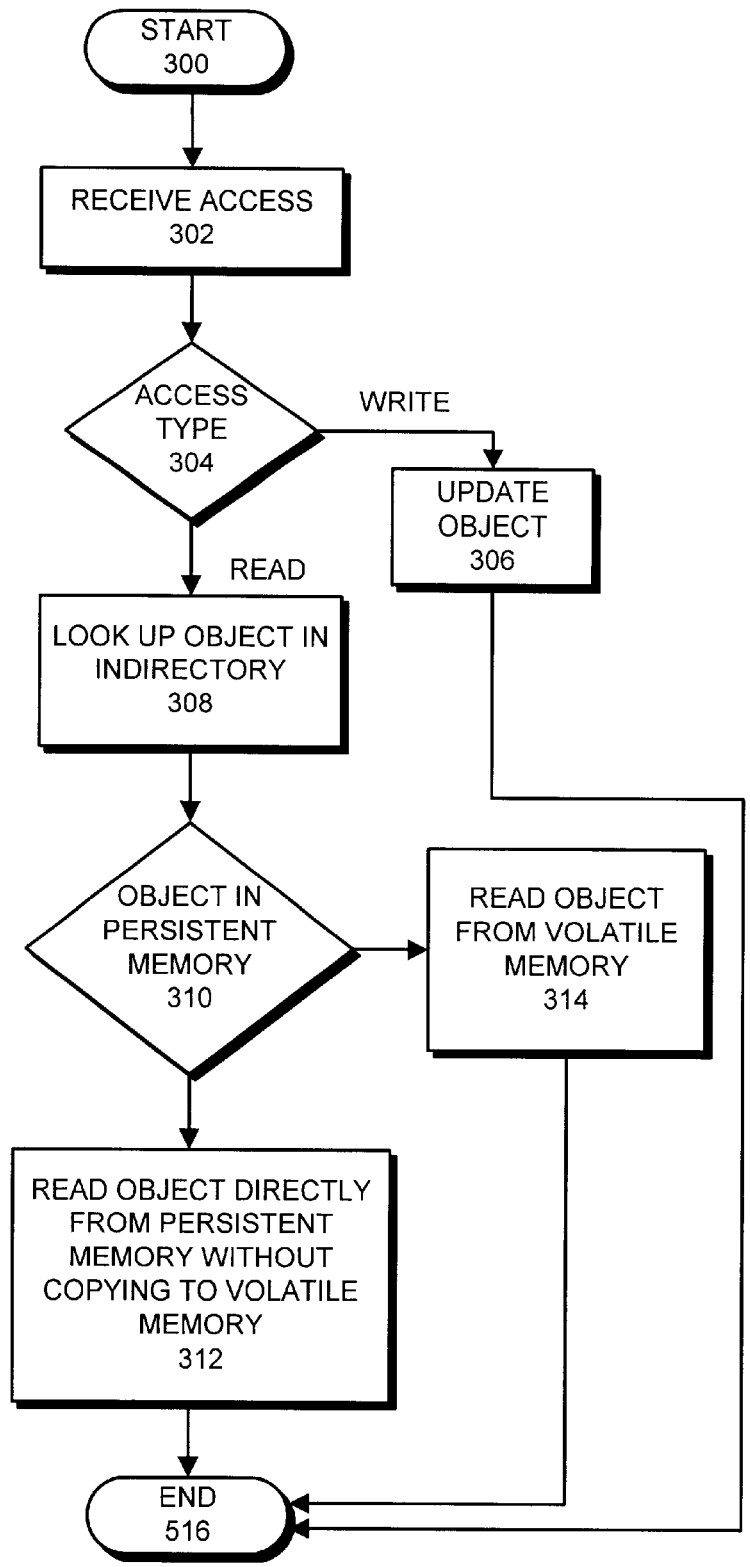
FIG. 3 is a flow chart illustrating the process of servicing an access to an object in accordance with an embodiment of the present invention.

FIG. 3 is a flow chart illustrating the process of servicing an access to an object in accordance with an embodiment of the present invention. The system starts by receiving an access (step 302). Next, the system determines if the access is a read access or a write access (step 304). If the access is write access, the system updates the object (step 306). This updating process is described in more detail below with reference to FIG. 6.

If the access is a read access, the system looks up a pointer to the object in indirectory 116 (step 308). This indirectory is a data structure containing pointers to objects in either persistent memory 120 or volatile memory 110. Next, the system determines from the pointer whether or not the object is located in persistent memory 120 (step 310). If the object is located in persistent memory 120, the system reads the object directly from persistent memory 120 without first copying the object to volatile memory 110 (step 312). On the other hand, if the object is located in volatile memory 110, the system reads the object directly from volatile memory 110 (step 314).

Updating an Object

Figure 4:
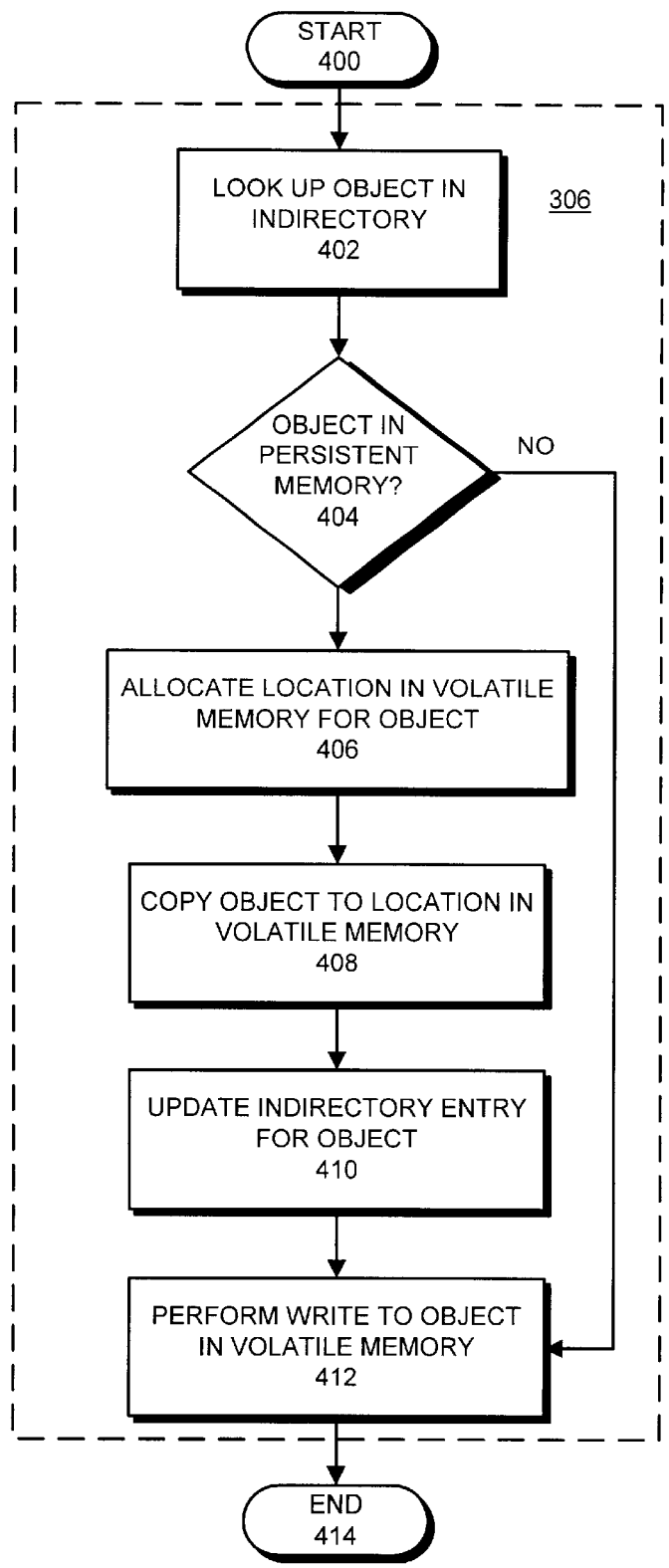
FIG. 4 is a flow chart illustrating the process of updating an object in accordance with an embodiment of the present invention.

FIG. 4 is a flow chart illustrating the process of updating an object in accordance with an embodiment of the present invention. This flow chart illustrates in more detail the process described above with reference to step 306 in FIG. 1.

The system starts by looking up a pointer to the object in indirectory 116 (step 402). The system then determines from the pointer if the object is located in persistent memory (step 404). If the object is not located in persistent memory, the system performs a write to the object in.volatile memory 110 (step 412).

If the system determines that the object is located in persistent memory, the system allocates a location in volatile memory 110 for the object (step 406). This process is described in more detail below with reference to FIG. 5. Next, the system copies the object to the allocated location in persistent volatile memory 110 (step 408), and updates indirectory 116 to point to the allocated location (step 410). At this point, the system performs the write to the object in volatile memory 110 (step 412).

Allocating a Location in Volatile Memory

Figure 5:
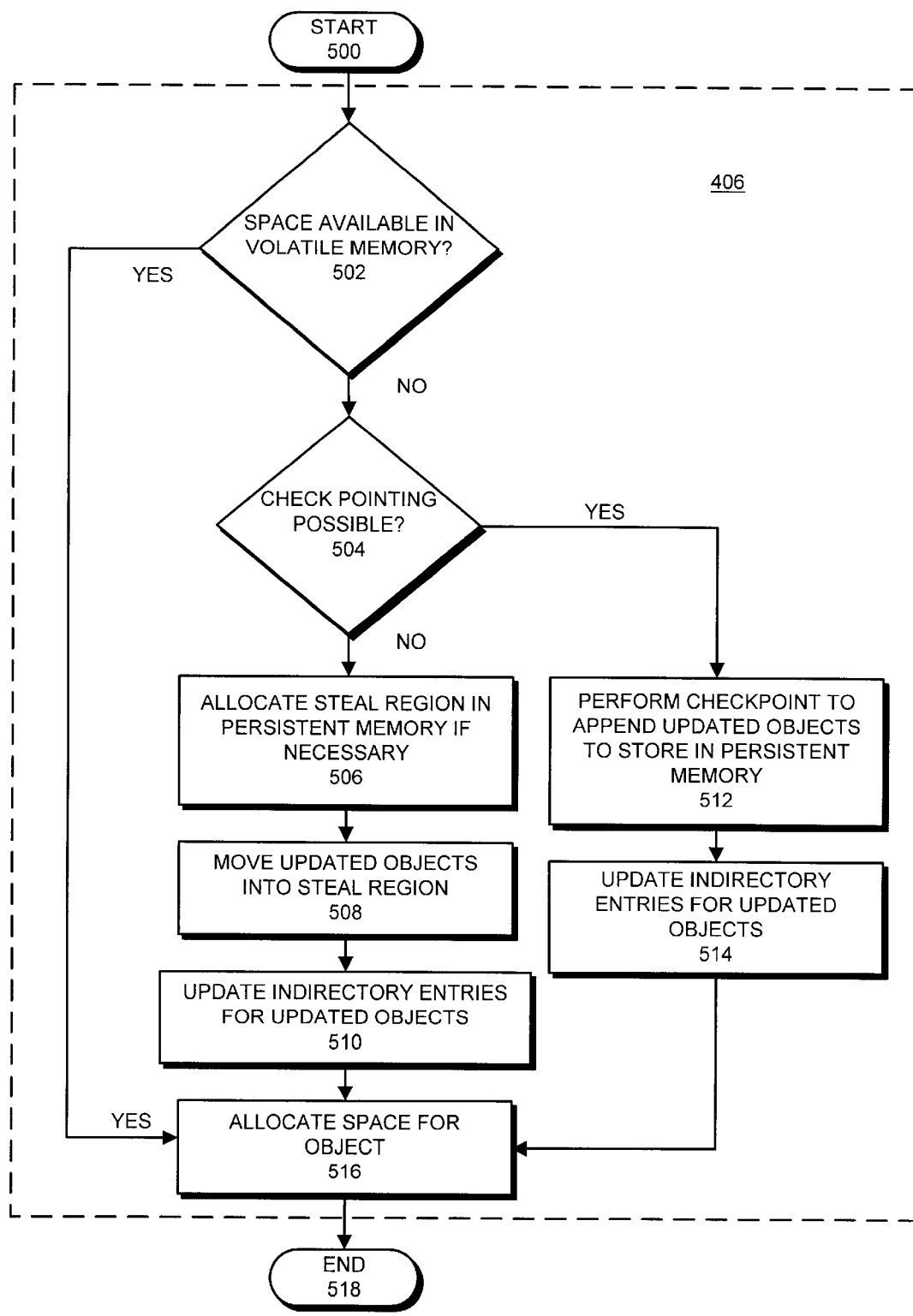
FIG. 5 is a flow chart illustrating the process of allocating a location in volatile memory in accordance with an embodiment of the present invention.

FIG. 5 is a flow chart illustrating the process of allocating a location in volatile memory 110 in accordance with an embodiment of the present invention. The system first determines if there is space available in volatile memory 110 (step 502). If so, the system allocates space for the object within volatile memory 110 (step 516).

If no space is available, the system determines if a checkpointing operation is possible in order to free up some space (step 504). A checkpointing operation is possible if a group of objects within volatile memory 110 are in a consistent state.

If a checkpointing operation is possible, the system performs the checkpointing operation to append updated objects to log-structured object store 122 within persistent memory 120 (step 512). The system also updates entries within indirectory 116 to point to log-structured object store 122 (step 514). Finally, the system allocates space for the object within volatile memory 110 (step 516).

If a checkpointing operation is not possible, the system allocates a "steal region " 124 within persistent memory 120 if such a steal region 124 has not already been allocated (step 506). Next, the system moves updated objects that are not ready to be committed to log-structured object store 122 into steal region 124 (step 508), and updates corresponding entries within indirectory 116 to point to steal region 124 (step 510). Note that during a subsequent checkpointing operation, reachable stolen objects within steal region 124 are committed log-structured object store 122, and their space within steal region 124 is reclaimed. Finally, the system allocates space for the object within volatile memory 110 (step 516).

Periodic Checkpointing

Figure 6:
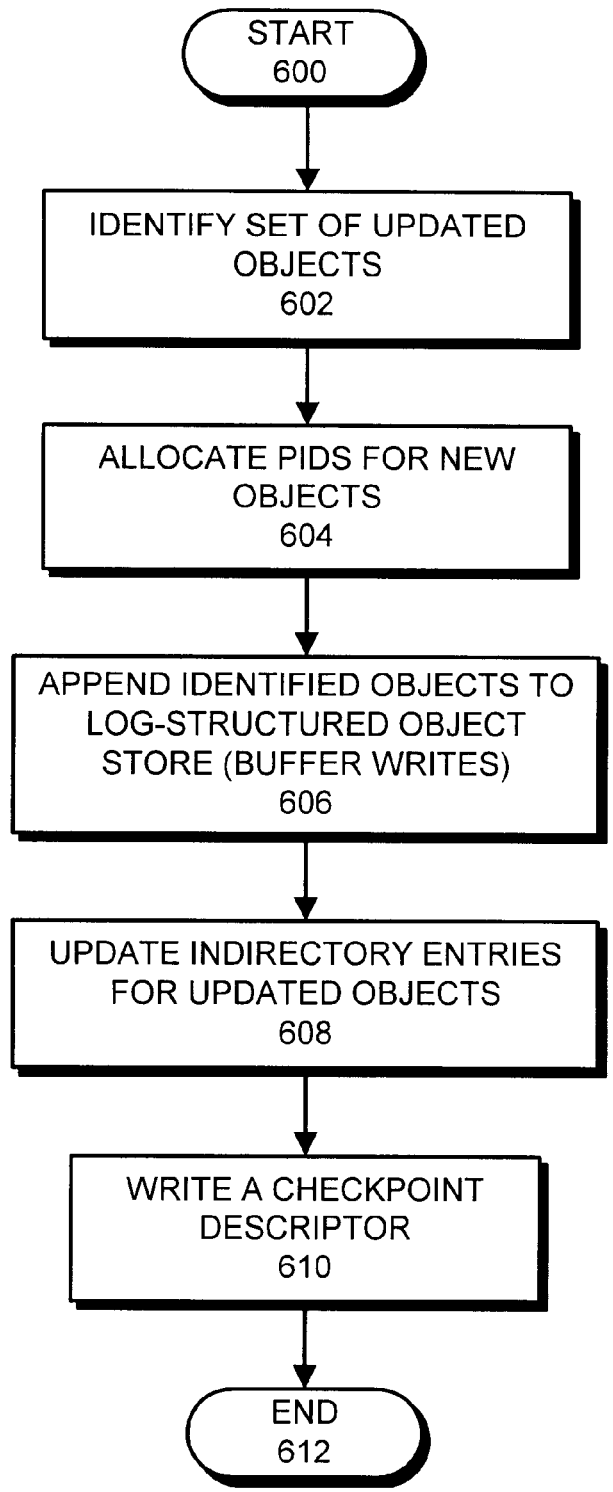
FIG. 6 is a flow chart illustrating the process of periodic checkpointing in accordance with an embodiment of the present invention.

FIG. 6 is a flow chart illustrating the process of periodic checkpointing in accordance with an embodiment of the present invention. This periodic checkpointing process can be take place as a part of a garbage collection process in response to a triggering event or a timer. It can also be triggered explicitly by an application program 114, or implicitly by platform-independent virtual machine 112. Objects within a garbage-collected heap in object cache 118 that are transitively reachable from certain roots are made persistent during a checkpointing operation by copying them to log-structured object store 122. In contrast to existing object caching architectures, objects only need to reside in volatile memory 110 if they have been modified with respect to their image in persistent memory 120 and have not been checkpointed since. If an object is not modified, it is accessed directly in persistent memory 120.

The system starts by determining a set of updated objects within volatile memory 110 that are ready to be checkpointed (step 602). If some of these objects are newly created objects, the system allocates PIDs and corresponding entries in indirectory 116 for them (step 604).

Next, the system appends the identified objects to log-structured object store 122 (step 606). As mentioned above, this may involve buffering updated objects within buffer 119. The system also updates entries within indirectory 116 for the updated objects to point to log-structured object store 122 (step 608).

After the checkpointing process is complete, the system outputs a checkpoint descriptor summarizing the checkpointing operation to log structured object store 122 (step 610).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating storage of objects in a persistent memory with asymmetric access characteristics, comprising:

receiving an access to an object; and if the access is a read access,
looking up the object through an indirectory, wherein the indirectory includes an indirectory entry for the object that points to a location of the object within the persistent memory if updates to the object have been recorded in the persistent memory, and otherwise points to a location of the object within a volatile memory;

if the object is located in the volatile memory, reading the object from the volatile memory; and if the object is located in the persistent memory, reading the object from the persistent memory directly without first copying the object into the volatile memory;

wherein accessing the object through the indirectory allows the object to be easily moved between volatile memory and persistent memory without having to modify programs that access the object; and wherein when an object is updated in the persistent memory the updated object is appended to a log structured object store in the persistent memory instead of overwriting a current version of the persistent object and a corresponding indirectory entry for the object is updated to point to the updated object, whereby updates are more evenly distributed across persistent memory to help extend the life of the persistent memory.

2. The method of claim 1, wherein if the access is a write access, the method further comprises:

looking up the object through the indirectory;

if the object is located in the persistent memory,
allocating a location in the volatile memory for the object, copying the object from the persistent memory into the location in the volatile memory, and updating the indirectory entry for the object to point to the location in the volatile memory;

performing the write access to the object in the volatile memory; and committing the object to the persistent memory from the volatile memory at a later time.

3. The method of claim 2, wherein committing the object to the persistent memory involves:

appending the object to a location within a log within the persistent memory; and updating the indirectory entry for the object to point to the location of the object within the log.

4. The method of claim 2, wherein allocating the location in the volatile memory for the object involves:
- determining if there is space available for the object in the volatile memory; and
- if there is no space available, creating additional space in the volatile memory by,
- determining if a checkpointing operation is possible,
- if the checkpointing operation is possible,
  - performing the checkpointing operation to commit updated objects from the volatile memory to a log within the persistent memory, thereby freeing up space in the volatile memory, and updating corresponding entries for the updated objects in the indirectory to point to the log within the persistent memory.

5. The method of claim 4, wherein if the checkpointing operation is not possible, the method further comprises creating space in the volatile memory by:
- allocating a steal region in the persistent memory if the steal region is not already allocated in the persistent memory;
- moving updated objects, which are not ready to be committed to the log, into the steal region in the persistent memory; and
- updating corresponding entries for the updated objects in the indirectory to point to the steal region in the persistent memory.

6. The method of claim 1, further comprising:
- periodically checkpointing updated objects from the volatile memory to a log within the persistent memory; and
- updating corresponding entries for the updated objects in the indirectory to point to the log in the persistent memory.

7. The method of claim 1,
- wherein the persistent memory includes flash memory; and
- wherein the volatile memory includes a volatile semiconductor memory.

8. The method of claim 1, wherein the object includes an object defined within an object oriented programming system.

9. A computer-readable storage medium storing instructions that when executed by a computer cause the computer to perform a method for facilitating storage of objects in a persistent memory with asymmetric access characteristics, the method comprising:
- receiving an access to an object; and
- if the access is a read access,
  - looking up the object through an indirectory, wherein the indirectory includes an indirectory entry for the object that points to a location of the object within the persistent memory if updates to the object have been recorded in the persistent memory, and otherwise points to a location of the object within a volatile memory;
- if the object is located in the volatile memory, reading the object from the volatile memory; and
- if the object is located in the persistent memory, reading the object from the persistent memory directly without first copying the object into the volatile memory;
- wherein accessing the object through the indirectory allows the object to be easily moved between volatile memory and persistent memory without having to modify programs that access the object; and
- wherein when an object is updated in the persistent memory the updated object is appended to a log structured object store in the persistent memory instead of overwriting a current version of the persistent object and a corresponding indirectory entry for the object is updated to point to the updated object, whereby updates are more evenly distributed across persistent memory to help extend the life of the persistent memory.

10. The computer-readable storage medium of claim 9, wherein if the access is a write access, the method further comprises:
- looking up the object through the indirectory;
- if the object is located in the persistent memory,
  - allocating a location in the volatile memory for the object,
  - copying the object from the persistent memory into the location in the volatile memory, and
  - updating the indirectory entry for the object to point to the location in the volatile memory;
- performing the write access to the object in the volatile memory; and
- committing the object to the persistent memory from the volatile memory at a later time.

11. The computer-readable storage medium of claim 10, wherein committing the object to the persistent memory involves:
- appending the object to a location within a log within the persistent memory; and
- updating the indirectory entry for the object to point to the location of the object within the log.

12. The computer-readable storage medium of claim 10, wherein allocating the location in the volatile memory for the object involves:
- determining if there is space available for the object in the volatile memory; and
- if there is no space available, creating additional space in the volatile memory by,
- determining if a checkpointing operation is possible,
- if the checkpointing operation is possible,
  - performing the checkpointing operation to commit updated objects from the volatile memory to a log within the persistent memory, thereby freeing up space in the volatile memory, and
  - updating corresponding entries for the updated objects in the indirectory to point to the log within the persistent memory.

13. The computer-readable storage medium of claim 12, wherein if the checkpointing operation is not possible, the method further comprises creating space in the volatile memory by:
- allocating a steal region in the persistent memory if the steal region is not already allocated in the persistent memory;
- moving updated objects, which are not ready to be committed to the log, into the steal region in the persistent memory; and
- updating corresponding entries for the updated objects in the indirectory to point to the steal region in the persistent memory.

14. The computer-readable storage medium of claim 9, wherein the method further comprises:
- periodically checkpointing updated objects from the volatile memory to a log within the persistent memory; and
- updating corresponding entries for the updated objects in the indirectory to point to the log in the persistent memory.

15. The computer-readable storage medium of claim 9,
wherein the persistent memory includes flash memory; and
wherein the volatile memory includes a volatile semiconductor memory.

16. The computer-readable storage medium of claim 9, wherein the object includes an object defined within an object oriented programming system.

17. An apparatus that facilitates storage of objects in a persistent memory with asymmetric access characteristics, the apparatus comprising:
   an access processing mechanism that is configured to receive an access to an object;
   a lookup mechanism that is configured to look up the object through an indirectory, wherein the indirectory includes an indirectory entry for the object that points to a location of the object within the persistent memory if updates to the object have been recorded in the persistent memory, and otherwise points to a location of the object within a volatile memory;
   a reading mechanism that is configured to read the object from the volatile memory if the object is located in the volatile memory;
   wherein the reading mechanism is also configured to read the object from the persistent memory directly without first copying the object into the volatile memory if the object is located in the persistent memory; and
   wherein accessing the object through the indirectory allows the object to be easily moved between volatile memory and persistent memory without having to modify programs that access the object; and
   wherein when an object is updated in the persistent memory the updated object is appended to a log structured object store in the persistent memory instead of overwriting a current version of the persistent object and a corresponding indirectory entry for the object is updated to point to the updated object, whereby updates are more evenly distributed across persistent memory to help extend the life of the persistent memory.

18. The apparatus of claim 17, wherein the access processing mechanism includes:
   an object moving mechanism, wherein if the access is a write access, and if the object is located in the persistent memory, the object moving mechanism is configured to move the object to the volatile memory;
   an allocation mechanism, within the object moving mechanism, which is configured to allocate a location in the volatile memory for the object,
   a copying mechanism, within the object moving mechanism, which is configured to copy the object from the persistent memory into the location in the volatile memory;
   an updating mechanism, within the object moving mechanism, which is configured to update the indirectory entry for the object to point to the location in the volatile memory;
   a writing mechanism that is configured to perform the write access to the object in the volatile memory; and
   a commit mechanism that is configured to commit the object to the persistent memory from the volatile memory at a later time.

19. The apparatus of claim 18, wherein the commit mechanism is configured to:
   append the object to a location within a log within the persistent memory; and to
   update the indirectory entry for the object to point to the location of the object within the log.

20. The apparatus of claim 18, further comprising:
   a checkpointing mechanism that is configured to,
      determine if a checkpointing operation is possible,
      perform the checkpointing operation, if possible, to commit updated objects from the volatile memory to a log within the persistent memory, thereby freeing up space in the volatile memory, and to
      update corresponding entries for the updated objects in the indirectory to point to the log within the persistent memory;
   wherein the allocation mechanism is additionally configured to,
      determine if there is space available for the object in the volatile memory, and to
      create additional space in the volatile memory if there is no space available using the checkpointing mechanism.

21. The apparatus of claim 20, further comprising a memory stealing mechanism, wherein if the checkpointing operation is not possible, the memory stealing mechanism is configured to:
   allocate a steal region in the persistent memory if the steal region is not already allocated in the persistent memory;
   move updated objects, which are not ready to be committed to the log, into the steal region in the persistent memory; and to
   update corresponding entries for the updated objects in the indirectory to point to the steal region in the persistent memory.

22. The apparatus of claim 17, further comprising a checkpointing mechanism that is configured to:
   periodically checkpoint updated objects from the volatile memory to a log within the persistent memory; and to
   update corresponding entries for the updated objects in the indirectory to point to the log in the persistent memory.

23. The apparatus of claim 17,
   wherein the persistent memory includes flash memory; and
   wherein the volatile memory includes a volatile semiconductor memory.

24. The apparatus of claim 17, wherein the object includes an object defined within an object oriented programming system.

* * * * *